(12) United States Patent
Schmiedl et al.

(10) Patent No.: US 7,259,259 B2
(45) Date of Patent: Aug. 21, 2007

(54) REACTIVE DYES, A PROCESS FOR THEIR PREPARATION AND THEIR USE

(75) Inventors: Jürgen Schmiedl, Steinen (DE); Damien Schoehn, Ensisheim (FR); Klaus Koch, Muttenz (CH)

(73) Assignee: Huntsman International LLC, The Woodlands, TX (US)

( * ) Notice: Subject to any disclaimer, the term of this patent is extended or adjusted under 35 U.S.C. 154(b) by 0 days.

(21) Appl. No.: 10/536,679

(22) PCT Filed: Nov. 24, 2003

(86) PCT No.: PCT/EP03/50878

§ 371 (c)(1),
(2), (4) Date: May 27, 2005

(87) PCT Pub. No.: WO2004/050769

PCT Pub. Date: Jun. 17, 2004

(65) Prior Publication Data

US 2006/0016027 A1    Jan. 26, 2006

(30) Foreign Application Priority Data

Dec. 2, 2002   (EP) ................................. 02406046

(51) Int. Cl.
*C09B 62/445* (2006.01)
*C09B 67/22* (2006.01)

(52) U.S. Cl. .............. 544/189; 8/549; 8/917; 8/924

(58) Field of Classification Search .......... 544/189; 8/549, 917, 924
See application file for complete search history.

(56) References Cited

U.S. PATENT DOCUMENTS

| | | | |
|---|---|---|---|
| 3,223,470 A | 12/1965 | Boedeker et al. ........... 8/39 |
| 3,426,018 A | 2/1969 | Eckersley et al. ....... 260/239.7 |
| 3,427,308 A | 2/1969 | Barben et al. ........... 260/240 |
| 4,631,341 A | 12/1986 | Kayane et al. ........... 544/189 |
| 4,786,721 A | 11/1988 | Tzikas et al. ............ 534/617 |
| 5,601,622 A | 2/1997 | Müller .................... 8/676 |
| 5,779,740 A | 7/1998 | Lehmann et al. ........ 8/549 |
| 6,063,137 A | 5/2000 | Scheibli et al. ......... 8/549 |

FOREIGN PATENT DOCUMENTS

| | | |
|---|---|---|
| EP | 0070807 | 1/1983 |
| EP | 0214093 | 3/1987 |
| EP | 0775776 | 5/1997 |
| EP | 1247842 | 10/2002 |
| EP | 1325945 | 7/2003 |
| JP | 50-157422 | 12/1975 |
| JP | 56-118975 | 9/1981 |
| JP | 57-042985 | 3/1982 |

OTHER PUBLICATIONS

Derwent Abstract 12821 K/06 for EP 0070807 (1983).
Derwent Abstract 1978-23836 A [13] for JP 50157422 (1975).
Derwent Abstract 80731 D/44 for JP 56118975 (1981).

*Primary Examiner*—Fiona T Powers

(57) ABSTRACT

Reactive dyes of formula (1): wherein $R_1$, is optionally substituted $C_1$-$C_4$ alkyl, $R_2$ is halogen, $C_1$-$C_4$ alkyl, $C_1$-$C_4$ alkoxy or sulfo, $Z_1$ is a radical of formula —$SO_2$—Y (2a), —CO—NH—$(CH_2)_K$—$SO_2$—Y (2b), —NH—CO—CH(Hal)—$CH_2$—Hal (2c) —NH—CO—C(Hal)=$CH_2$ or (2d) wherein Hal is chlorine or bromine, Y is vinyl or a radical —$CH_2CH_2$—U and U is a group removable under alkaline conditions, k is the number 2, 3, 4, 5 or 6, n is the number 0, 1 or 2 and m is the number 0 or 1, are suitable for dyeing or printing cellulose-containing fibre materials, preferably natural or synthetic polyamide fibre materials, and produce, with a high colour yield, dyeings and prints having good fastness properties (1)

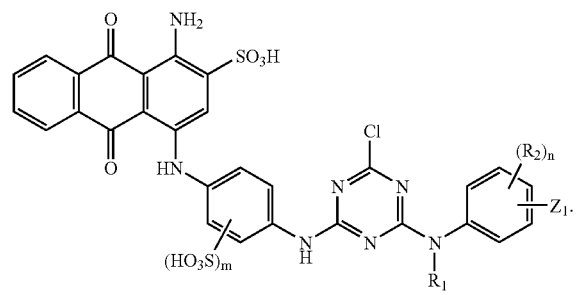

11 Claims, No Drawings

REACTIVE DYES, A PROCESS FOR THEIR PREPARATION AND THEIR USE

The present invention relates to novel reactive dyes, to a process for their preparation and to their use in the dyeing or printing of textile fibre materials.

The practice of dyeing using reactive dyes has recently led to higher demands being made on the quality of the dyeings and the profitability of the dyeing process. As a result, there continues to be a need for novel reactive dyes having improved properties, especially in respect of their application.

Dyeing nowadays requires reactive dyes that have sufficient substantivity and at the same time have good ease of washing off of unfixed dye. They should also have a good colour yield and high reactivity, the objective being to provide especially dyeings having high degrees of fixing. The known dyes do not satisfy these requirements in all properties.

The problem underlying the present invention is accordingly to find, for the dyeing and printing of fibre materials, novel improved reactive dyes having the qualities characterised above to a high degree. The novel dyes should especially be distinguished by high fixing yields and high fibre-dye bond stabilities. The dyes should also yield dyeings having good allround properties, for example fastness to light and to wetting.

It has been found that the problem posed is largely solved by the novel dyes defined hereinbelow, especially when the dyes are used for dyeing synthetic polyamide fibre materials.

The present invention therefore relates to reactive dyes of formula (1)

wherein
$R_1$ is optionally substituted $C_1$-$C_4$alkyl,
$R_2$ is halogen, $C_1$-$C_4$alkyl, $C_1$-$C_4$alkoxy or sulfo,
$Z_1$ is a radical of formula $$-SO_2-Y \quad (2a),$$

$$-CO-NH-(CH_2)_k-SO_2-Y \quad (2b),$$

$$-NH-CO-CH(Hal)-CH_2-Hal \quad (2c)$$

or $$-NH-CO-C(Hal)=CH_2 \quad (2d)$$

wherein
Hal is chlorine or bromine,
Y is vinyl or a radical $-CH_2CH_2-U$ and U is a group removable under alkaline conditions,
k is the number 2, 3, 4, 5 or 6,
n is the number 0, 1 or 2 and
m is the number 0 or 1.

The dyes of formula (1) according to the invention are fibre-reactive. Fibre-reactive compounds are to be understood as compounds that are capable of reacting with the hydroxyl groups of cellulose, with the amino, carboxy, hydroxy or thiol groups in wool and silk or with the amino groups and, optionally, with the carboxy groups of synthetic polyamides, to form covalent chemical bonds.

$C_1$-$C_4$Alkyl $R_1$ is, for example, methyl, ethyl, n-propyl, isopropyl, n-butyl, sec-butyl, tert-butyl or isobutyl, preferably methyl or ethyl, especially ethyl. The alkyl radical $R_1$ is unsubstituted or substituted, for example, by hydroxy, sulfo, sulfato, cyano or by carboxy. The unsubstituted radical is preferred.

As $C_1$-$C_4$alkyl there come into consideration for $R_2$ e.g. methyl, ethyl, n-propyl, isopropyl, n-butyl, sec-butyl, tert-butyl and isobutyl, preferably methyl or ethyl, especially methyl.

As $C_1$-$C_4$alkoxy there come into consideration for $R_2$ e.g. methoxy, ethoxy, n-propoxy, isopropoxy, n-butoxy, sec-butoxy, tert-butoxy and isobutoxy, preferably methoxy or ethoxy, especially methoxy.

As halogen there come into consideration for $R_2$ e.g. fluorine, chlorine and bromine, preferably chlorine or bromine, especially chlorine.

As a group U removable under alkaline conditions there come into consideration e.g. $-Cl$, $-Br$, $-F$, $-OSO_3H$, $-SSO_3H$, $-OCO-CH_3$, $-OPO_3H_2$, $-OCO-C_6H_5$, $-OSO_2-C_1$-$C_4$alkyl and $-OSO_2-N(C_1$-$C_4$alkyl$)_2$. U is preferably a group of formula $-Cl$, $-OSO_3H$, $-SSO_3H$, $-OCO-CH_3$, $-OCO-C_6H_5$ or $-OPO_3H_2$, especially $-Cl$ or $-OSO_3H$, more especially $-OSO_3H$.

Examples of suitable radicals Y are accordingly vinyl, β-bromo- or β-chloro-ethyl, β-acetoxy-ethyl, β-benzoyloxy-ethyl, β-phosphatoethyl, β-sulfatoethyl and β-thiosulfatoethyl. Y is preferably vinyl, β-chloroethyl or isulfatoethyl, especially vinyl or isulfatoethyl, more especially vinyl.

In the reactive dye of formula (1) according to the invention, $R_2$ is preferably $C_1$-$C_4$alkyl, $C_1$-$C_4$alkoxy or sulfo, especially sulfo.

In the reactive dye of formula (1) according to the invention, Hal is preferably bromine.

m is preferably the number 1.

n is preferably the number 0 or 1, especially the number 0. Preferably, m is the number i and n is the number 0.

k is preferably the number 2 or 3, especially the number 2.

In the reactive dye of formula (1) according to the invention, $Z_1$ is preferably a radical of formula (2a) or (2b), especially of formula (2a), the variables having the definitions and preferred meanings given above.

The reactive dye of formula (1) Is preferably a dye of formula (1a)

wherein $Z_1$ has the definitions and preferred meanings given above, the numbers 2' and 3' indicate the possible bonding positions of the sulfo group and the numbers 3 and 4 indicate the possible bonding positions of $Z_1$.

The sulfo group is preferably bonded in the 2'-position. $Z_1$ is preferably bonded in the 3-position.

The present invention relates also to a process for the preparation of reactive dyes of formula (1), which comprises reacting a compound of formula

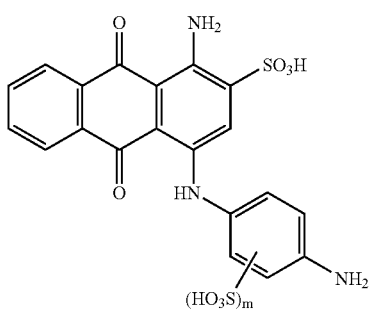

(2)

and a compound of formula

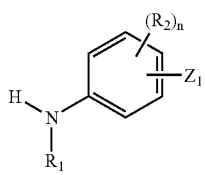

(3)

with cyanuric chloride, $R_1$, $R_2$, $Z_1$, m and n having the definitions and preferred meanings given above.

Since the individual process steps can be carried out in different orders, including, if desired, simultaneously, various process variants are possible. The reaction is usually carried out stepwise, the order in which the single reactions between the individual reaction components is carried out advantageously being governed by the particular conditions. For example, about one molar equivalent of an amine of formula (3) is reacted with about one molar equivalent of cyanuric chloride and the resulting product is then condensed with about one molar equivalent of a compound of formula (2). In another process variant, for example about one molar equivalent of a compound of formula (2) is reacted with about one molar equivalent of cyanuric chloride and the resulting mixture is then condensed with about one molar equivalent of an amine of formula (3).

The individual condensation reactions are carried out e.g. in accordance with processes known per se, generally in aqueous solution, at a temperature of e.g. from 0 to 50° C., especially from 0 to 10° C., and a pH of e.g. from 1 to 10, especially from 1 to 7.

The end product can optionally also be subjected to a transformation reaction. Such a transformation reaction is, for example, the conversion into its vinyl form of a reactive group in the radical $Z_1$ that is capable of being vinylated, e.g. by treatment with dilute sodium hydroxide solution, for example the conversion of the β-sulfatoethylsulfonyl or β-chloroethylsulfonyl group into the vinylsulfonyl radical or the conversion of the α,β-dihalopropionylamino group Into the α-haloacryloylamino radical. Such reactions are known per se. Such a transformation reaction is generally carried out in a neutral to alkaline medium at a temperature of e.g. from 20 to 70° C., at a pH of e.g. from 6 to 14.

The compounds of formulae (2) and (3) are known or can be prepared analogously to known processes.

The reactive dyes of formula (1) according to the invention are suitable for dyeing or printing nitrogen-containing or hydroxyl-group-containing fibre materials, paper or leather, e.g. textile fibre materials of cellulose, silk and especially wool or synthetic polyamides.

Preference is given to the dyeing or printing of natural or synthetic polyamide fibre materials, especially synthetic polyamide fibre materials.

The reactive dyes of formula (1) yield level, brilliant dyeings having good alround properties, especially good fastness to rubbing, to wetting, to wet rubbing and to light. They are also distinguished by uniform colour build-up, good affinity, high reactivity, good fixing ability and very good build-up ability. The dyes according to the invention have good water-solubility and are readily combinable with other dyes.

The present invention relates also to a process for dyeing or printing hydroxyl-group-containing or nitrogen-containing fibre materials, preferably natural or synthetic polyamide fibre materials and especially synthetic polyamide fibre materials, which process comprises using at least one reactive dye of formula (1), wherein $R_1$, $R_2$, $Z_1$, m and n have the definitons and preferred meanings given above; together with at least one reactive dye selected from the group of formulae

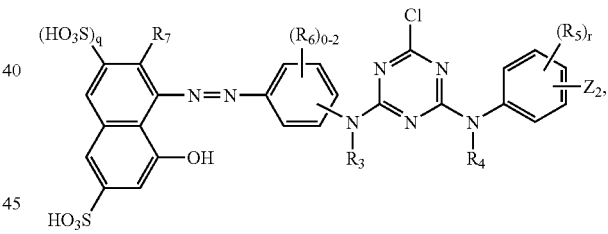

(4)

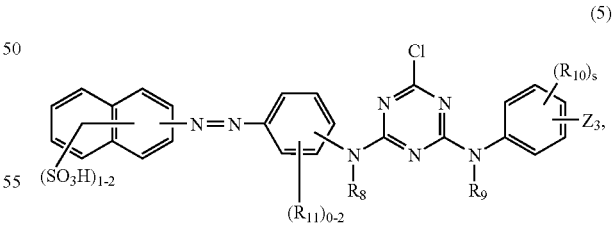

(5)

(6)

and

-continued (7)

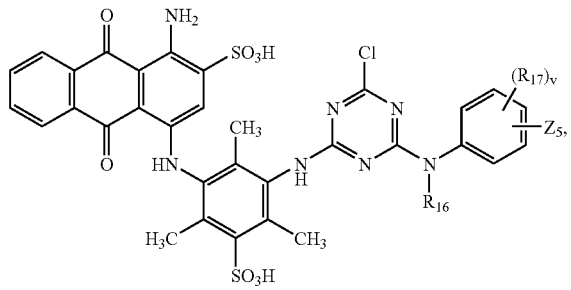

wherein
$R_3$, $R_4$, $R_8$, $R_9$, $R_{12}$, $R_{13}$ and $R_{16}$ are each independently of the others hydrogen or unsubstituted or substituted $C_1$-$C_4$alkyl, $R_5$, $R_{10}$, $R_{14}$ and $R_{17}$ are each independently of the others halogen, $C_1$-$C_4$alkyl, $C_1$-$C_4$alkoxy or sulfo, $(R_6)_{0-2}$ and $(R_{11})_{0-2}$ are each independently of the other 0, 1 or 2 subsgtuents selected from the group $C_1$-$C_4$alkyl, $C_1$-$C_4$alkoxy, $C_1$-$C_4$alkanoylamino, ureido, sulfamoyl, halogen, sulfo and carboxy, $R_7$ is amino or N-mono- or N,N-di-$C_1$-$C_4$alkylamino, $R_{16}$ is $C_1$-$C_4$alkyl, carboxy, unsubstituted $C_1$-$C_4$alkoxy or $C_1$-$C_4$alkoxy substituted by carboxy, K is a phenyl radical, which is substituted by 0, 1, 2 or 3 substituents selected from the group $C_1$-$C_4$alkyl, $C_1$-$C_4$alkoxy, sulfamoyl, carbamoyl, halogen, sulfo and carboxy, or is a naphthyl radical substituted by 1, 2 or 3 sulfo groups, $Z_2$, $Z_3$, $Z_4$ and $Z_5$, each independently of the others, have the definitions given for $Z_1$, q is the number 0 or 1, and r, s, t and v are each independently of the others the number 0, 1 or 2.

The radicals $R_3$, $R_4$, $R_8$, $R_9$, $R_{12}$, $R_{13}$ and $R_{16}$ as $C_1$-$C_4$alkyl radicals are straight-chain or branched. Examples that may be mentioned are methyl, ethyl, n-propyl, isopropyl, n-butyl, isobutyl, sec-butyl and tert-butyl, preferably methyl and ethyl. The alkyl radicals are unsubstituted or may be further substituted, for example by hydroxy, sulfo, sulfato, cyano or by carboxy. Preferred as substituents are hydroxy, sulfo or sulfato, especially hydroxy or sulfato, more especially hydroxy. The unsubstituted radicals are preferred.

As $C_1$-$C_4$alkyl there come into consideration for $R_5$, $R_8$, $R_{10}$, $R_{11}$, $R_{14}$, $R_{15}$ and $R_{17}$ each independently of the others, e.g. methyl, ethyl, n-propyl, isopropyl, n-butyl, sec-butyl, tert-butyl and isobutyl, preferably methyl or ethyl, especially methyl.

As $C_1$-$C_4$alkoxy there come into consideration for $R_5$, $R_8$, $R_{10}$, $R_{11}$, $R_{14}$, $R_{15}$ and $R_{17}$, each independently of the others, e.g. methoxy, ethoxy, propoxy, isopropoxy, n-butoxy, sec-butoxy, tert-butoxy and isobutoxy, preferably methoxy or ethoxy, especially methoxy. The radical $R_{15}$ may be substituted by carboxy.

As halogen there come into consideration for $R_5$, $R_8$, $R_{10}$, $R_{11}$, $R_{14}$ and $R_{17}$, each independently of the others, e.g. fluorine, chlorine and bromine, preferably chlorine or bromine, especially chlorine.

As $C_2$-$C_4$alkanoylamino there come into consideration for $R_8$ and $R_{11}$, independently of one another, e.g. acetylamino and propionylamino, especially acetylamino.

As N-mono- or N,N-di-$C_1$-$C_4$alkylamino there come into consideration for $R_7$ e.g. methylamino, ethylamino, n-propylamino, n-butylamino, N,N-dimethylamino and N,N-diethylamino, preferably methylamino, ethylamino, N,N-dimethylamino or N,N-diethylamino, especially methylamino, ethylamino or N,N-dimethylamino.

K as a phenyl radical is unsubstituted or substituted by 1, 2 or 3 substituents selected from the group $C_1$-$C_4$alkyl, e.g. methyl or ethyl, preferably methyl; $C_1$-$C_4$alkoxy, e.g. methoxy or ethoxy, preferably methoxy; sulfamoyl, carbamoyl, halogen, e.g. bromine, chlorine or fluorine, preferably chlorine; sulfo and carboxy.

K as a naphthyl radical is substituted by 1, 2 or 3, preferably 1 or 2, sulfo groups.

Preferably, the radicals $R_3$, $R_8$ and $R_{12}$ are each independently of the others hydrogen, methyl or ethyl, especially hydrogen.

Preferably, the radicals $R_4$, $R_5$, $R_{13}$ and $R_{16}$ are each independently of the others hydrogen, methyl or ethyl, especially hydrogen.

In a particular embodiment of the present invention, the radicals $R_4$, $R_9$, $R_{13}$ and $R_{16}$ are ethyl.

The radicals $R_5$, $R_{10}$, $R_{14}$ and $R_{17}$ each independently of the others have the preferred meanings given above for $R_2$.

Preferably, $R_6$ and $R_{11}$ independently of one another are $C_1$-$C_4$alkyl, $C_1$-$C_4$alkoxy, $C_2$-$C_4$alkanoylamino, ureido, sulfo or carboxy, especially $C_1$-$C_4$alkyl, $C_1$-$C_4$alkoxy, $C_1$-$C_4$alkanoylamino, ureido or sulfo.

$R_8$ is especially preferably a sulfo group.

$R_{11}$ is especially preferably a ureido radical or a $C_2$-$C_4$alkanoylamino radical, more especially a $C_2$-$C_4$alkanoylamino radical.

$R_7$ is preferably amino.

K is preferably a phenyl radical substituted by 1, 2 or 3 subsultuents selected from the group $C_1$-$C_4$alkyl, $C_1$-$C_4$alkoxy, halogen and sulfo, especially halogen and sulfo.

$Z_2$, $Z_3$ and $Z_4$, each independently of the others, have the definitions and preferred meanings given above for $Z_1$.

In the reactive dye of formula (7), $Z_5$ is preferably a radical of formula (2a) or (2b), especially of formula (2b), wherein the variables have the definitions and preferred meanings given above.

q is preferably the number 0.

There come into consideration for r, s, t and v, each independently of the others, the definitions and preferred meanings given above for n.

Special preference is given to the process according to the inventon in which the reactive dye of formula (1) is a reactive dye of formula (1a) wherein $Z_1$ has the definitions and preferred meanings given above and $Z_1$ and the sulfo group are preferably bonded as indicated above.

Preference is given to the process according to the invention wherein, in the reactive dye of formula (4),
$R_3$, $R_4$ and $R_5$ are each hydrogen, $R_8$ is a sulfo group, $R_7$ is amino, $Z_2$ is a radical of formula (2a) wherein Y is vinyl, and q and r are each the number 0.

Preference is given to the process according to the invention wherein, in the reactive dye of formula (5),
$R_8$, $R_9$ and $R_{10}$ are each hydrogen, $R_1$, is an acetylamino group, $Z_3$ is a radical of formula (2a) wherein Y is vinyl, and s is the number 0, and the naphthyidiazo component has 2 sulfo groups.

Preference is given to the process according to the invention wherein, in the reactive dye of formula (6),
$R_{12}$, $R_{13}$ and $R_{14}$ are each hydrogen, $R_{15}$ is methyl, $Z_4$ is a radical of formula (2a) wherein Y is vinyl, and t is the number 0, and K Is a 2,5-dichloro-4-sulfophenyl radical.

Preference is given to the process according to the invention wherein, in the reactive dye of formula (7), $R_{16}$ and $R_{17}$ are each hydrogen, $Z_5$ a radical of formula (2b) wherein Y is vinyl and k is the number 2, and v is the number 0.

A particular embodiment of the process according to the invention comprises using at least one reactive dye of formula (1) together with a reactive dye of formula (6), wherein $R_1$, $R_2$, $R_{12}$, $R_{13}$, $R_{14}$, $R_{15}$, K, $Z_1$, $Z_4$, m, n and t have the definitions and preferred meanings given above.

The above-described embodiment yields brilliant green hues that exhibit scarcely any catalytic fading.

The reactive dyes of formulae (4), (5), (6) and (7) are known or can be prepared analogously to known processes.

The sulfo groups present in the reactive dye of formula (1) according to the invention and in the reactive dyes of formulae (4), (5), (6) and (7) are each either in the form of their free acid or, preferably, in the form of a salt thereof. Salts that come into consideration include, for example, the alkali metal, alkaline earth metal and ammonium salts, salts of an organic amine and mixtures thereof. Examples that may be mentioned are sodium, lithium, potassium and ammonium salts, the salt of mono-, di- or tri-ethanolamine and Na/Li or Na/Li/NH$_4$ mixed salts.

The reactive dyes of formula (1) according to the invention and the reactive dyes of formulae (4), (5), (6) and (7) may comprise further additives, e.g. sodium chloride or dextrin.

The process according to the invention and the reactive dyes of formula (1) can be used in accordance with customary dyeing or printing processes. In addition to comprising water and the dyes, the dyeing liquors or printing pastes may comprise further additives, for example wetting agents, anti-foams, levelling agents or agents that influence the properties of the textile material, for example softeners, additives for flame-resistant finishes or dirt-, water- and oil-repellents and also water-softeners and natural or synthetic thickeners, e.g. alginates and cellulose ethers.

The amounts in which the individual dyes are used in the dye baths or printing pastes may vary within wide limits depending on the desired depth of colour; amounts of from 0.01 to 15% by weight, especially from 0.1 to 10% by weight, based on the goods to be dyed and the printing paste have proved advantageous.

Printing methods such as, for example, displacement printing or space dyeing are important in the case of carpet fabrics.

Preference is given to dyeing that is carried out especially according to the exhaust method and, in the case of carpet dyeing, it can also be carried out according to the continuous method.

Synthetic polyamide fibres are preferably dyed at a pH value of from 2 to 7, especially from 2.5 to 5.5, more especially from 2.5 to 4. The liquor ratio can be selected from within a wide range, e.g. from 1:5 to 1:50. preferably from 1:5 to 1:30. Dyeing is preferably carried out at a temperature of from 80 to 130° C., especially from 85 to 120° C.

In order to enhance the wet-fastness properties of dyed synthetic polyamide fibres, an aftertreatment can be carried out at a pH value of e.g. from 7 to 12, especially from 7 to 9, and a temperature of e.g. from 30 to 100° C., especially from 50 to 80° C., to remove any unfixed dye. In the case of intense hues, for example in the case of dyeings of very deep colour, especially on fibre blends, unfixed dye can advantageously be removed reductively, by adding to the alkaline aftertreatment bath a reducing agent, for example a hydrosulfite, e.g. sodium hydrosulfite. Dye that has been fixed in the fibre material is not attacked by the treatment. Advantageously, the amount of reducing agent added is e.g. from 0.1 to 6% by weight, especially from 0.5 to 5% by weight, based on the weight of the aftertreatment bath.

The reactive dyes used in the process according to the invention are distinguished by uniform colour build-up, good affinity and good fixing ability, good constancy of shade even at different concentrations, good fastness properties and are especially also readily combinable with other dyes. The reactive dyes used in the process according to the invention are advantageously suitable for metamerism control, that is to say, two shades that match in daylight will also match in other light, for example artificial light.

Synthetic polyamide fibre materials suitable for dyeing or printing in accordance with the invention include, for example, polyamide-6 (poly-ε-caprolactam), polyamide-6,6 (polyhexamethyleneadipamide), polyamide-7, polyamide-6, 12 (polyhexamethylenedodecanoamide), polyamide-11 and polyamide-12, copolyamides with polyamide-6,6 orwith polyamide-6, e.g. polymers of hexamethylenediamine, ε-caprolactam and adipic acid and polymers of adipic acid, hexamethylenediamine and isophthalic acid or of adipic acid, hexamethylenediamine and 2-methylpentamethylenediamine or 2-ethyltetramethylenediamine, and also blend fabrics or mixed yarns of synthetic polyamide and wool.

The process according to the invention and the reactive dyes according to the invention are advantageously suitable also for dyeing or printing microfibres of synthetic polyamides. Microfibres are understood to mean fibre materials constructed from threads having an individual thread fineness of 1 denier (1.1 dTex). Such microfibres are known and are usually produced by melt-spinning.

The said textile material may be in an extremely wide variety of manufactured forms, e.g. In the form of fibres, yarns, woven fabrics or knitted fabrics and in the form of carpets.

Level dyeings having good allround properties, especially good fastness to rubbing, to wetting, to wet rubbing and to light, are obtained The following Examples serve to illustrate the invention. The temperatures are given in degrees Celsius. Unless otherwise indicated, parts are parts by weight and percentages relate to percent by weight. Parts by weight relate to parts by volume in the same ratio as kilograms to litres.

EXAMPLE 1 a) 4.7 parts of cyanuric chloride are suspended in the course of from 10 to 15 minutes at a temperature of from 0 to 2° C. in 47 parts of ice, 23 parts of water and 0.025 part of Na$_2$HPO$_4$×12H$_2$O. In the course of 45 minutes at a temperature of from 0 to 2° C., a solution of 12 parts of a compound of formula

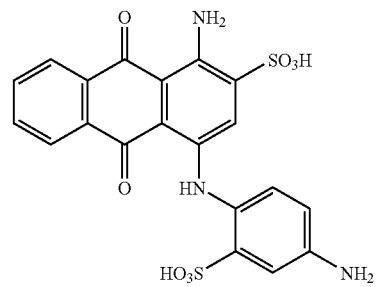

in 150 parts of water and 18.1 parts of an aqueous 2N sodium hydroxide solution is then fed in, the pH being maintained at a value of 5 by the addition of aqueous 2N sodium hydroxide solution. Stirring is then carried out for 40 minutes at a temperature of from 0 to 2° C. A solution is obtained, which comprises the compound, Indicated in the form of the free acid, of formula

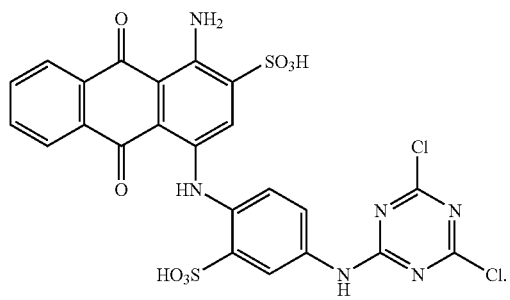

b) 8.2 parts of a compound of formula

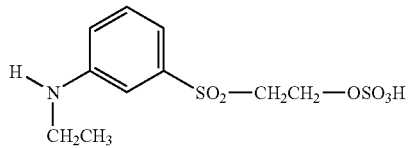

are dissolved in 140 parts of water. The resulting solution is added dropwise in the course of 45 minutes to the solution, cooled to a temperature of from 0 to 20C, obtained according to a). During the addition, the pH is maintained at a value of 6 by means of aqueous 2N sodium hydroxide solution. Stirring is then carried out overnight at a temperature of from 0 to 2° C. and a pH value of 6. For the purpose of converting the β-sulfatoethylsulfonyl form into the vinyl form, the pH value is adjusted to 10 using 2N sodium hydroxide solution and stirred for 30 minutes at room temperature. The reaction mixture is then rendered neutral using dilute hydrochloric acid and, after the addition of sodium chloride, is subsequently stirred for one hour in an ice bath. The precipitated dye is filtered off, washed with aqueous sodium chloride solution and dried at a temperature of 40° C. A dye is obtained which, In the form of the free acid, corresponds to the compound of formula

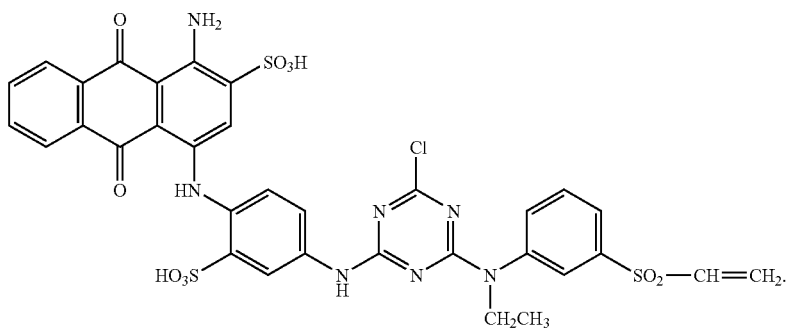

(101)

The dye of formula (101) dyes wool and synthetic polyamide fibre material in blue hues.

EXAMPLES 2 to 5

In a manner analogous to that described in in Example 1 it is possible to obtain the dyes of formulae

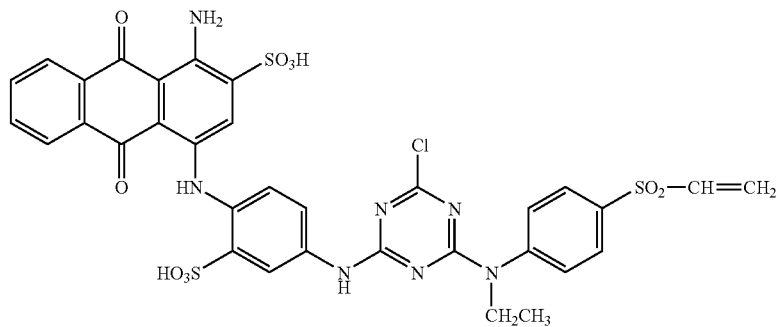

(102)

-continued

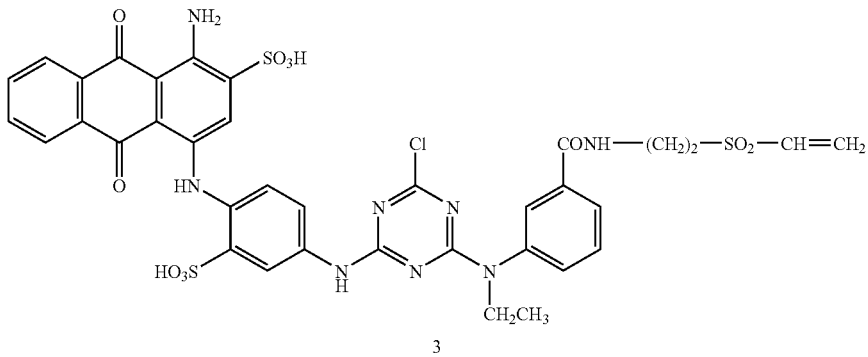

(103)

3

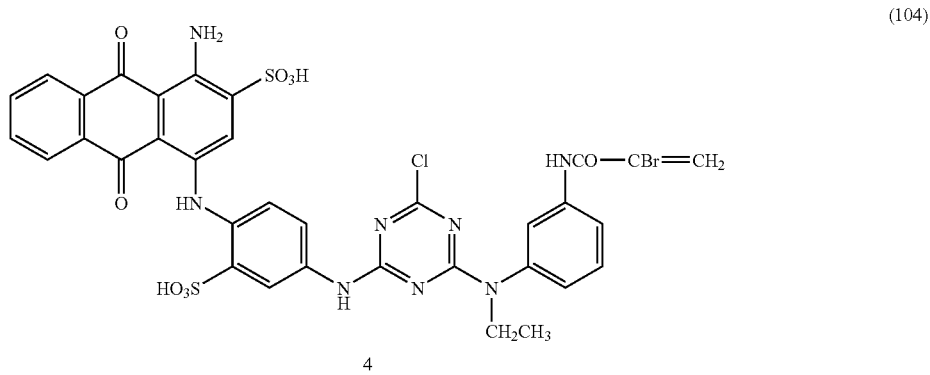

(104)

4

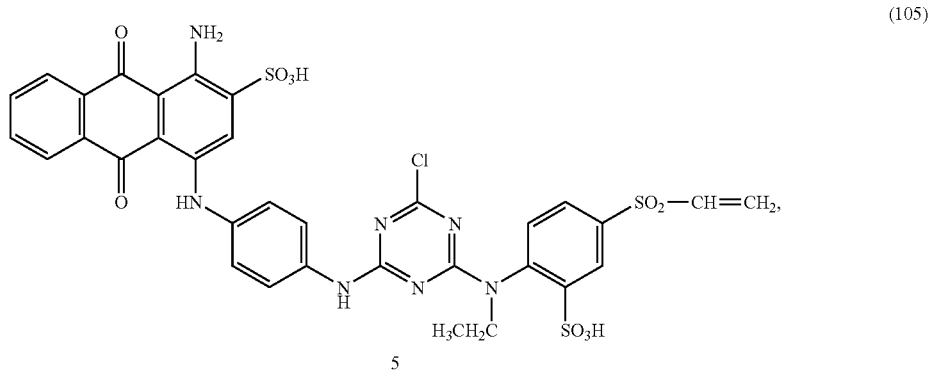

(105)

5 which dye wool and synthetic polyamide in brilliant blue hues.

Dyeing Procedure I:

10 parts of polyamide-6,6 fibre material (Helanca Jersey) are dyed in 500 parts of an aqueous liquor that contains 2 g/l of ammonium acetate and is adjusted to pH 5 using acetic acid. The content of dye according to Example 1 is 0.8% based on the weight of the fibre. The duration of dyeing at a temperature of 98° C. is from 30 to 90 minutes. The dyed fibre material is then removed and washed and dried as usual. A brilliant blue dyeing having very good fastness properties is obtained.

Dyeing procedure II:

10 parts of woollen knitting yarn are stirred at 30° C. in a dye bath that contains, per 100 parts of water, 0.8 part of the dye according to Example 1, 0.5 part of sodium sulfate and 2 parts of sodium acetate and that has been adjusted to a pH of 4.5 using acetic acid (80%). The liquor is brought to the boil in the course of 45 minutes and maintained at boiling temperature for a further 45 to 70 minutes. The dyed material is then removed, rinsed thoroughly with cold water and dried. A brilliant blue dyeing having very good fastness properties is obtained.

Process Example 1

A polyamlde-6,6 carpet fabric is dyed continuously from a dye bath containing, per
1000 parts of the dye bath,
0.46 part of the blue dye of formula (101), 0.28 part of the red dye of formula

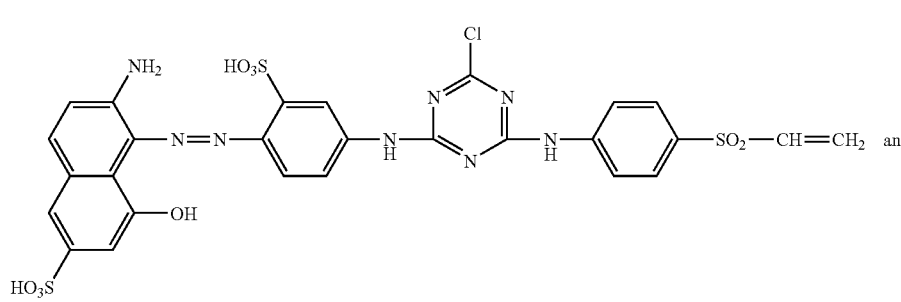

(106)

and 0.8 part of the yellow dye of formula

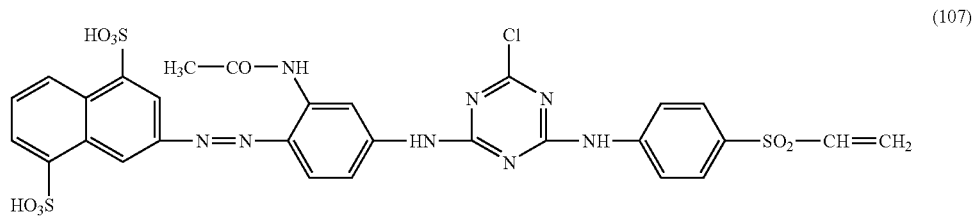

(107)

and, in addition, 1.0 part of a commercially available thickener, 3.0 parts of a commercially available antifreeze, 1.0 part of a non-ionic wetting agent, and citric acid in an amount sufficient to establish a pH value of 5.5 in the dye bath. The carpet fabric is then fixed in steam for 5 minutes at 1001° C., washed in the usual manner and dried. The carpet fabric is distinguished by a uniform dark-brown dyeing having good fastness properties.

Process Examples 2 and 3

By proceeding as in Process Example 1 but, instead of using 0.46 part of the blue dye of formula (101), 0.28 part of the red dye of formula (106) and 0.8 part of the yellow dye of formula (107), using the reactive dyes indicated below in Table 1, column 2, in the amounts indicated, there are likewise obtained brown dyeings having good levelness and good fastness properties.

TABLE 1

Ex. Dyes
2  0.40 part of the blue dye of formula (101),
    0.45 part of the red dye of formula (106) and
    0.70 part of the yellow dye of formula

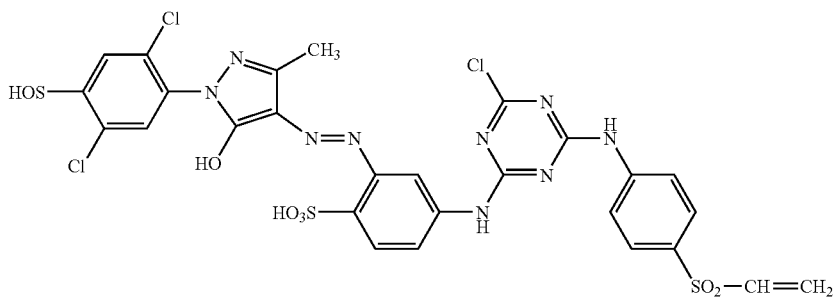

(108)

TABLE 1-continued

Ex. Dyes
3  0.20 part of the blue dye of formula (101),
   0.20 part of the blue dye of formula

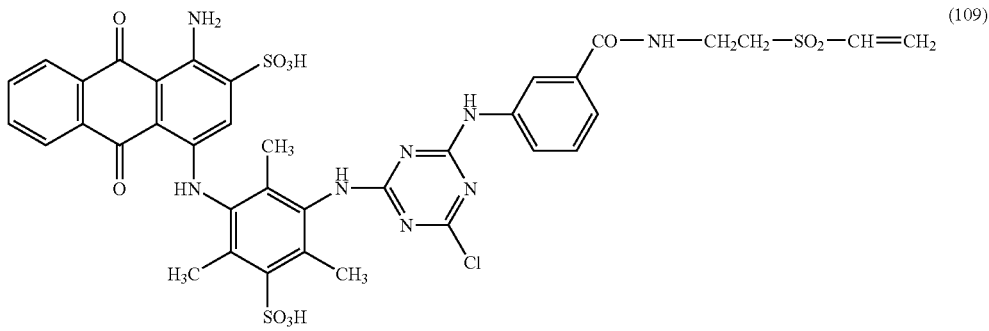
(109)

0.45 part of the red dye of formula (101) and
   0.42 part of the yellow dye of formula (108)

Process Examples 4

In a dyeing apparatus, 100 kg of textured polyamide-6,6 jersey are treated for 10 minutes at 40° C. with 2000 litres of liquor containing 4 kg of acetic acid, 0.5 g of wetting agent and 1 kg of a levelling agent The pH of the liquor is 3.4. There are then added, predissolved in a small amount of water, 430 g of the dye of formula (101) and 440 g of the dye of formula (108).

The material to be dyed is treated in the dye liquorfor 5 minutes at 40° C. and then heated to 98° C. at a heating rate of 1° C./min and dyed at that temperature for 60 minutes. The dyeing is finished in the usual manner. A brilliant green level dyeing having very good fastness properties is obtained.

Process Examples 5

In a dyeing apparatus, 70 kg of a fabric of polyamide-6,6 microfibres are treated for 10 minutes at 40° C. with 1500 litres of liquor containing 3 kg of formic acid, 0.4 kg of wetting agent and 0.7 kg of a levelling agent. The pH of the liquor is 2.9. There are then added, predissolved in a small amount of water, 700 g of the dye of formula (107), 1300 g of the dye of formula (106) and 430 g of the dye of formula (101). The material to be dyed is treated in the dye liquor for 5 minutes at 40° C. and then heated to 110° C. at a heating rate of 1° C./min and dyed at that temperature for 60 minutes. The dyeing procedure is followed by an alkaline aftertreatment in order to improve the wet-fastness properties. For that purpose, a fresh bath containing 2 g/l of soda and having a pH of 9.2 is used to treat the dyeing for 20 minutes at 60° C. The dyeing is then rinsed and finished in the usual manner. A level dyeing having excellent fastness properties is obtained.

Process Examples 6

The procedure is as described in Process Example 4, except that the alkaline aftertreatment is carded out at 70° C. Instead of at 60° C.

Process Examples 7

The procedure is as described in Process Example 4, except that the alkaline aftertreatment is carried out in a bath containing 5 g/l of soda and 5 g/l of hydrosulfite. The dyeing is treated for 20 minutes at 70° C. using that bath.

Process Examples 8

(Space Dyeing)
A carpet of polyamides yarn is first of all pad-dyed with a liquor containing, per 1000 parts of the liquor, the components indicated below:
0.008 part of the blue dye of formula (101),
0.003 part of the red dye of formula (106),
0.01 part of the yellow dye of formula (107),
3.00 parts of a commercially available thickener,
2.00 parts of a commercially available non-ionic wetting agent,
1.00 part of a commercially available antifreeze,
the pH being adjusted to 5 using the required amount of citric acid.

Areas of the dyed carpet are then printed with a printing paste containing, per 1000 parts of printing paste, the components indicated below:
0.50 part of the blue dye of formula (101),
0.50 part of the red dye of formula (106),
15.0 parts of a commercially available thickener,
2.00 parts of a commercially available non-ionic wetting agent,
1.00 part of a commercially available antifreeze,
the pH being adjusted to 5 using the required amount of citric acid.

The dyed and partially printed carpet is then treated with saturated steam for 5 minutes at 100° C., washed in the usual manner and dried, yielding a carpet having red printed areas on a beige-coloured ground, those areas being distinguished by good levelness with good fastness properties.

Process Examples 9

(Continuous Dyeing)

A carpet of polyamide-6,6 yarn is continuously dyed with a liquor containing, per 1000 parts of the liquor, the components indicated below.

0.46 part of the blue dye of formula (101),
0.28 part of the red dye of formula (106),
0.8 part of the yellow dye of formula (107),
1.00 part of a commercially available thickener,
1.00 part of a commercially available non-ionic wetting agent,
3.00 parts of a commercially available antifreeze, the pH being adjusted to 5.5 using the required amount of citric acid. The dyed carpet fabric is then treated with saturated steam for 5 minutes at 100° C., washed in the usual manner and dried, yielding a carpet distinguished by level dark-brown dyeing with good fastness properties.

Process Examples 10

(Displacement Printing)

A carpet of polyamide-6,6 yarn is first of all printed with various printing pastes containing the components indicated below, some of which are in varying amounts x, y and z:
x parts of Tectilon® Yellow 3R (Ciba Specialty Chemicals),
y parts of Tectilon® Red 2B (Ciba Specialty Chemicals),
z parts of Tecilon® Blue 4R-01 (Ciba Specialty Chemicals),
x is e.g. 1.05, y 0.34 and z 1,01,
15.0 parts of a commercially available thickener,
10.0 parts of Lyoprint® MP,
2.00 parts of a commercially available non-ionic wetting agent,
1.00 part of a commercially available antifreeze, the pH being adjusted to 4 using the required amount of citric acid.

The printed carpet is then dyed with a liquor containing, per 1000 parts of the liquor, the components indicated below (the liquor pick-up is 350%):

1.90 parts of the blue dye of formula (101),
0.62 part of the red dye of formula (106),
1.26 parts of the yellow dye of formula (107),
1.00 part of a commercially available thickener,
2.00 parts of a commercially available non-ionic wetting agent,
2.00 parts of a commercially available antifreeze, the pH being adjusted to 5.5 using the required amount of citric acid.

The carpet is then treated with saturated steam for 5 minutes at 100° C., washed in the usual manner and dried, yielding a carpet having coloured areas on a dark-violet ground, those areas being distinguished by good levelness with good fastness properties.

What is claimed is:

1. A reactive dye of formula

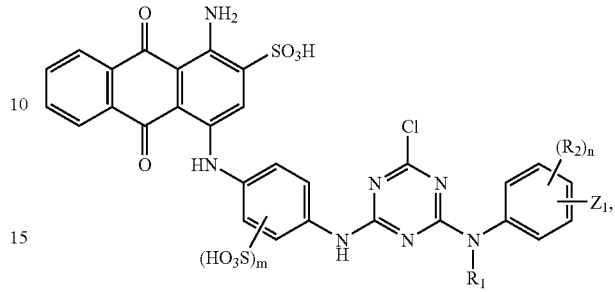

(1)

wherein $R_1$ is optionally substituted $C_1$-$C_4$alkyl, $R_2$ is halogen, $C_1$-$C_4$alkyl, $C_1$-$C_4$alkoxy or sulfo, $Z_1$ is a radical of formula $$-SO_2-Y \qquad (2a),$$

$$-CO-NH-(CH_2)_k-SO_2-Y \qquad (2b),$$

$$-NH-CO-CH(Hal)-CH_2-Hal \qquad (2c)$$

or $$-NH-CO-C(Hal)=CH_2 \qquad (2d)$$

wherein

Hal is chlorine or bromine,

Y is vinyl or a radical $-CH_2CH_2-U$ and U is a group removable under alkaline conditions, k is the number 2, 3, 4, 5 or 6, n is the number 0, 1 or 2 and m is the number 0 or 1.

2. A reactive dye according to claim 1, wherein $R_1$ is methyl or ethyl.

3. A reactive dye according to claim 1, wherein $Z_1$ is a radical of formula (2a) wherein Y is vinyl.

4. A reactive dye according to claim 1, wherein m is the number 1 and n is the number 0.

5. A process for the preparation of a reactive dye of formula (1) according to claim 1, which comprises reacting a compound of formula

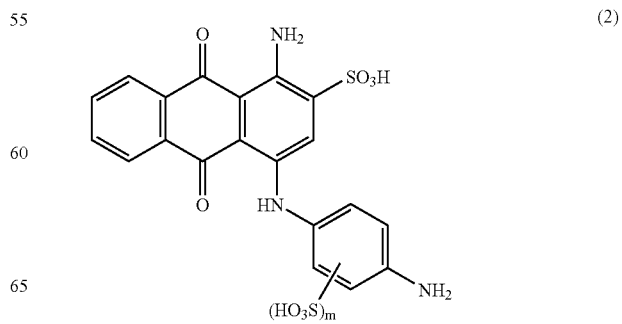

(2)

and a compound of formula

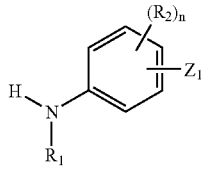
(3)

with cyanuric chloride, $R_1$, $R_2$, $Z_1$, m and n being as defined in claim 1.

6. A process for dyeing or printing a hydroxyl-group-containing or nitrogen-containing fibre material, which comprises contacting said material with a tinctorially effective amount of at least one reactive dye of formula

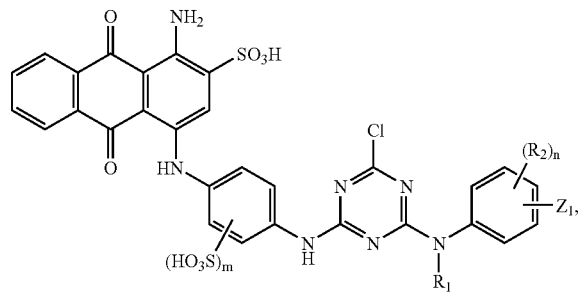
(1)

wherein
$R_1$ is optionally substituted $C_1$-$C_4$alkyl,
$R_2$ is halogen, $C_1$-$C_4$alkyl, $C_1$-$C_4$alkoxy or sulfo,
$Z_1$ is a radical of formula $$-SO_2-Y \quad (2a),$$
$$-CO-NH-(CH_2)_k-SO_2-Y \quad (2b),$$
$$-NH-CO-CH(Hal)-CH_2-Hal \quad (2c)$$
or
$$-NH-CO-C(Hal)=CH_2 \quad (2d)$$

wherein
Hal is chlorine or bromine,
Y is vinyl or a radical $-CH_2CH_2-U$ and U is a group removable under alkaline conditions,
k is the number 2, 3, 4, 5 or 6,
n is the number 0, 1 or 2 and
m is the number 0 or 1; together with
at least one reactive dye selected from the group of formulae

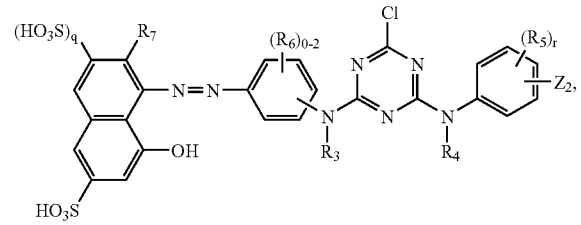
(4)

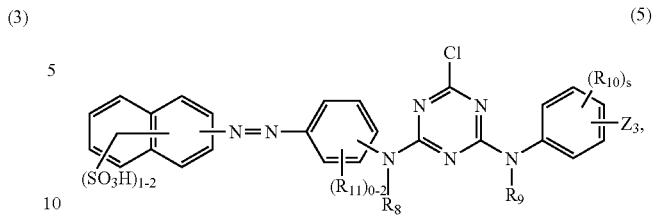
(5)

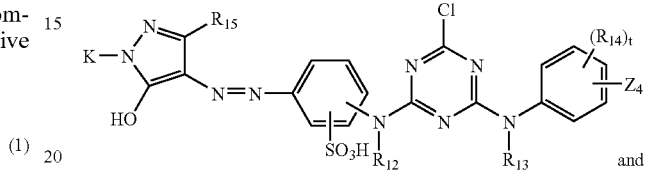
(6)
and

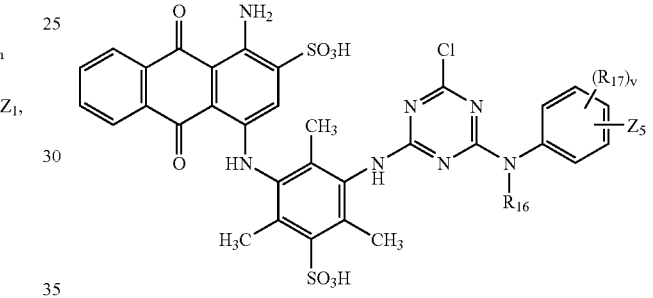
(7)

wherein
$R_3$, $R_4$, $R_8$, $R_9$, $R_{12}$, $R_{13}$ and $R_{16}$ are each independently of the others hydrogen or unsubstituted or substituted $C_1$-$C_4$alkyl,
$R_5$, $R_{10}$, $R_{14}$ and $R_{17}$ are each independently of the others halogen, $C_1$-$C_4$alkyl, $C_1$-$C_4$alkoxy or sulfo, $(R_6)_{0-2}$ and $(R_{11})_{0-2}$ are each independently of the other 0, 1 or 2 substituents selected from the group $C_1$-$C_4$alkyl, $C_1$-$C_4$alkoxy, $C_2$-$C_4$alkanoylamino, ureido, sulfamoyl, halogen, sulfo and carboxy, $R_7$ is amino or N-mono- or N,N-di-$C_1$-$C_4$alkylamino,
$R_{15}$ is $C_1$-$C_4$alkyl, carboxy, unsubstituted $C_1$-$C_4$alkoxy or $C_1$-$C_4$alkoxy substituted by carboxy,
K is a phenyl radical, which is substituted by 0, 1, 2 or 3 substituents selected from the group $C_1$-$C_4$alkyl, $C_1$-$C_4$alkoxy, sulfamoyl, carbamoyl, halogen, sulfo and carboxy, or is a naphthyl radical substituted by 1, 2 or 3 sulfo groups,
$Z_2$, $Z_3$, $Z_4$ and $Z_5$, each independently of the others, have the definitions given for $Z_1$, q is the number 0 or 1, and
r, s, t and v are each independently of the others the number 0, 1 or 2.

7. A process according to claim 6, which comprises using at least one reactive dye of formula (1) together with a reactive dye of formula (6), wherein $R_1$, $R_2$, $R_{12}$, $R_{13}$, $R_{14}$, $R_{15}$, K, $Z_1$, $Z_4$, m, n and t are as defined in claim 6.

8. A process according to claim 6, wherein a natural or synthetic polyamide fibre material is dyed or printed.

9. A process for dyeing or printing a hydroxyl-group-containing or nitrogen-containing fibre material, which comprises contacting said material with a tinctorially effective amount of at least one reactive dye of formula

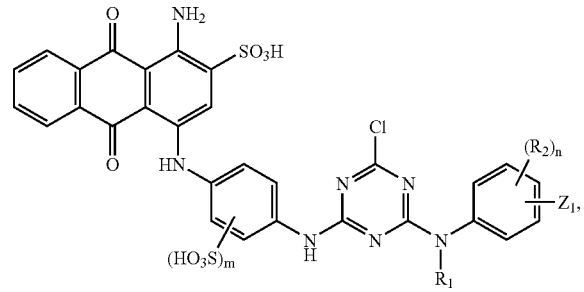

(1)

wherein
$R_1$ is optionally substituted $C_1$-$C_4$alkyl,
$R_2$ is halogen, $C_1$-$C_4$alkyl, $C_1$-$C_4$alkoxy or sulfo,
$Z_1$ is a radical of formula —$SO_2$—Y (2a), —CO—NH—$(CH_2)_k$—$SO_2$—Y (2b), —NH—CO—CH(Hal)—$CH_2$—Hal (2c)

or

—NH—CO—C(Hal)=$CH_2$ (2d)

wherein
Hal is chlorine or bromine,
Y is vinyl or a radical —$CH_2CH_2$—U and U is a group removable under alkaline conditions,
k is the number 2, 3, 4, 5 or 6,
n is the number 0, 1 or 2 and
m is the number 0 or 1.

10. A process according to claim 9, wherein a natural or synthetic polyamide fibre material is dyed or printed.

11. A process according to claim 9, wherein a synthetic polyamide fibre material is dyed or printed.

* * * * *